United States Patent [19]

Nakamura

[11] Patent Number: 5,231,343
[45] Date of Patent: Jul. 27, 1993

[54] DRIVING APPARATUS FOR STEPPING MOTOR CAPABLE OF RESTRAINING MOTOR NOISE

[75] Inventor: Yoshihito Nakamura, Yokohama, Japan

[73] Assignee: Kabushiki Kaisha Toshiba, Kawasaki, Japan

[21] Appl. No.: 721,879

[22] Filed: Jun. 27, 1991

[30] Foreign Application Priority Data

Jun. 28, 1990 [JP] Japan ................... 2-171213

[51] Int. Cl.$^5$ .............................................. H02P 8/00
[52] U.S. Cl. ...................................... 318/696; 318/685
[58] Field of Search ............................. 318/696, 685

[56] References Cited

U.S. PATENT DOCUMENTS 4,463,301 7/1984 Moriguchi et al. ................ 318/696
4,683,409 7/1987 Boillat .................................. 318/696

Primary Examiner—William M. Shoop, Jr.
Assistant Examiner—Karen Masih
Attorney, Agent, or Firm—Finnegan, Henderson, Farabow, Garrett & Dunner

[57] ABSTRACT

A driving apparatus for a stepping motor has first and second coils. The direction of the current flowing through each of the coils can be changed. A PWM-controlled stepping relay pulse generator is provided for imparting exciting current to the coils, and controls the duty factor of each stepping relay pulse at the rising and falling thereof.

15 Claims, 5 Drawing Sheets

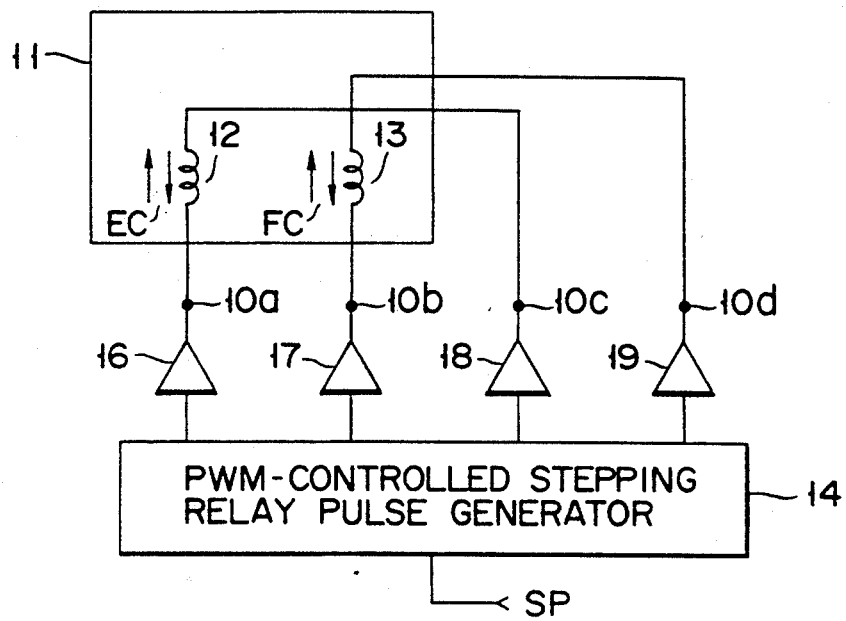
F I G. 1
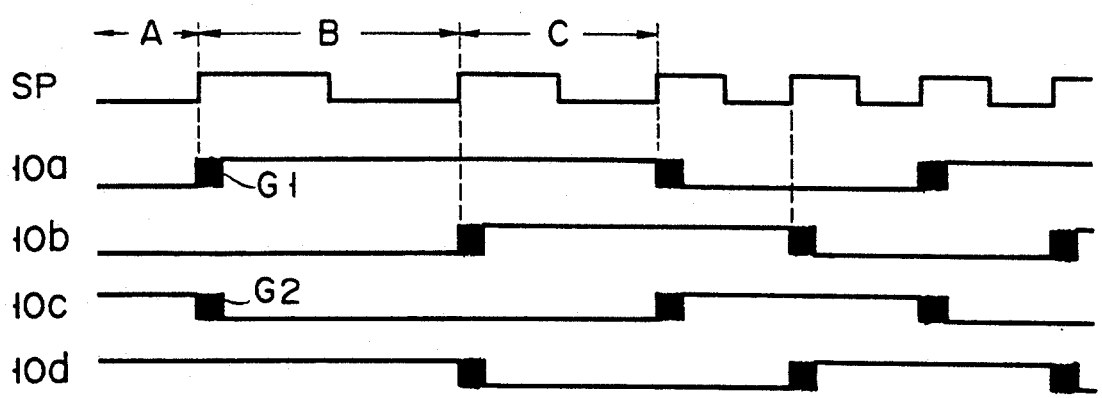
F I G. 2

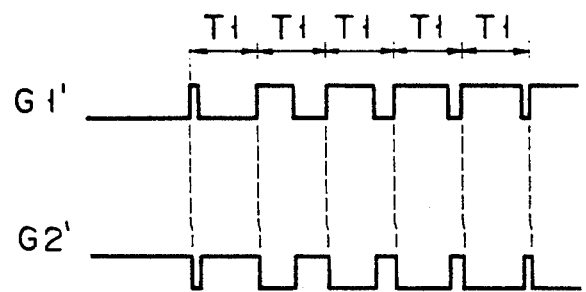
FIG. 5
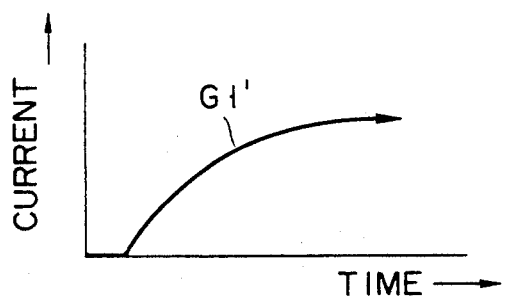 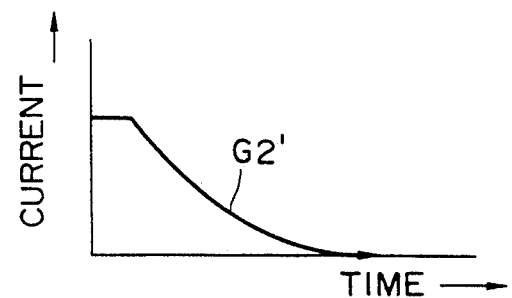
FIG. 6A  FIG. 6B
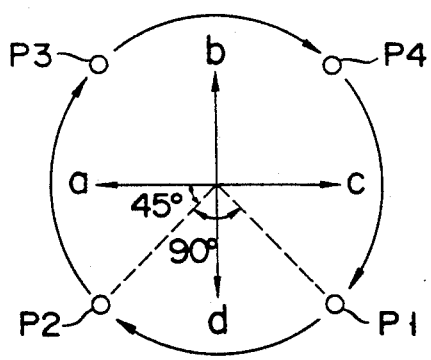
FIG. 7

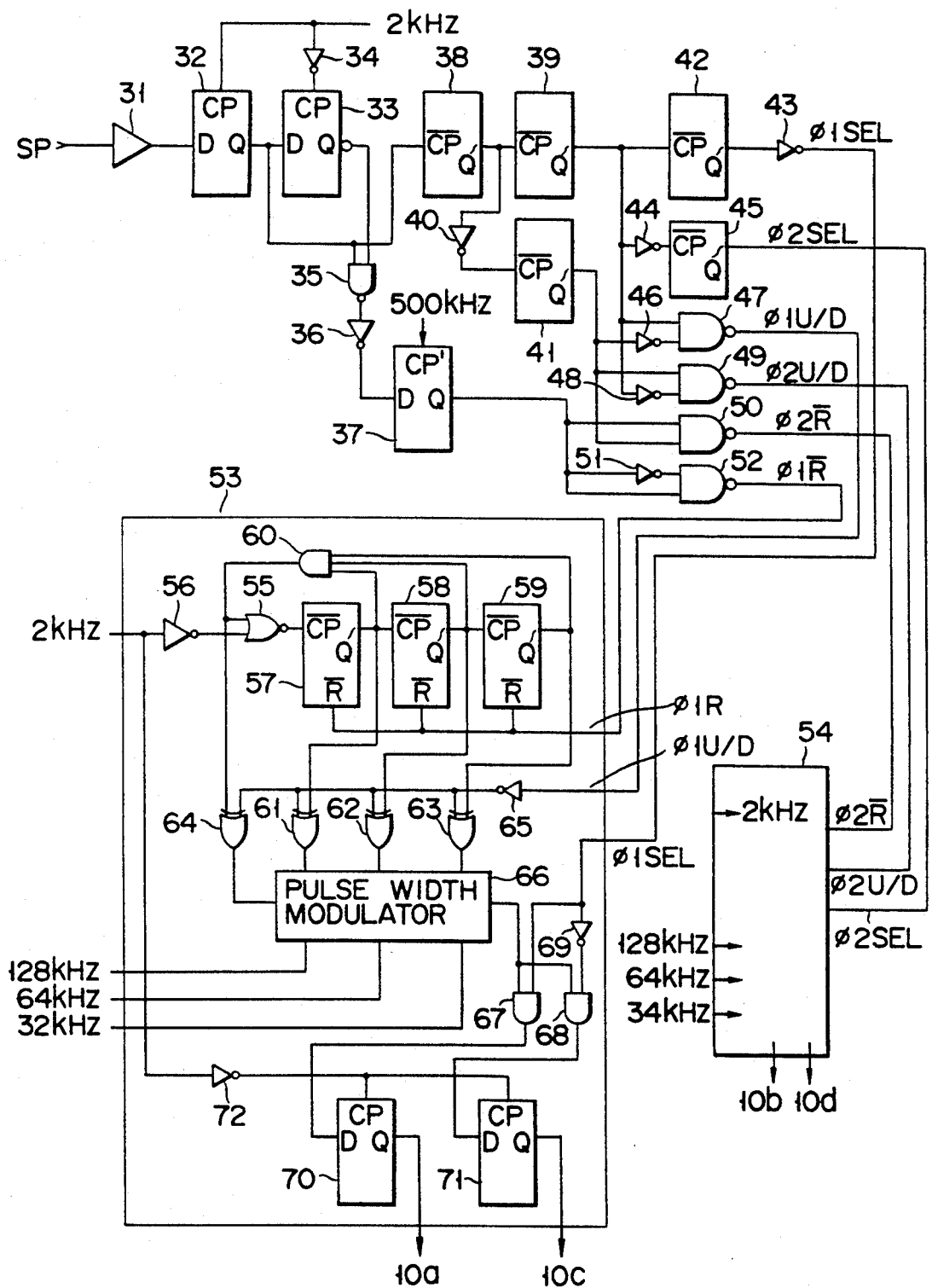
F I G. 8

DRIVING APPARATUS FOR STEPPING MOTOR CAPABLE OF RESTRAINING MOTOR NOISE

BACKGROUND OF THE INVENTION

1. Field of the Invention

This invention relates to a driving apparatus for driving a magnetic stepping motor to be used as the odometer of a vehicle.

2. Description of the Related Art

In general, a driving apparatus for a magnetic stepping motor (hereinafter referred to as "stepping motor") has a circuit constructed such that signal pulses are applied to a plurality of coils of the motor which are located adjacent to its motor having N and S poles, so as to rotate the rotor at a constant speed. The coils are magnetized in a predetermined order, thereby rotating the rotor at an exactly constant speed. Each of the signal pulses has a rectangular waveform showing a step response, i.e., having an abrupt rise and fall. Thus, the rotor will rotate abruptly in accordance with an abrupt change in the waveform, resulting in occurrence of motor noise.

To reduce the motor noise, a method is considered which varies the voltage waveform of each signal pulse so as to have a gentle rise and fall by interposing capacitors between adjacent coils. In this method, the time required for the change of the voltage waveform is relatively long, which results in a reduction in the motor noise.

However, capacitors to be used as above must be non-polar, and must have a capacitance of several tens μ F, inevitably being expensive and large. It is difficult to incorporate a circuit, having such large capacitors, in a small space for a vehicle odometer or the like.

SUMMARY OF THE INVENTION

It is the object of the invention to provide a driving apparatus for driving a stepping motor, which is capable of reducing the noise of a small stepping motor having no capacitors.

To attain the object, the driving apparatus of the invention comprises:

a plurality of coils located adjacent to the rotor of the stepping motor; and control pulse generating means for generating stepping relay pulse signals for imparting exciting current to the coils, each of the stepping relay pulse signals having a phase different from that of an input pulse, and also having a duty factor controlled at rising and falling edges of each pulse.

As described above, stepping relay pulse signals each having a duty factor controlled at rising and falling edges thereof are used for imparting exciting current to the coils. The torque of the rotor is gradually changed by gradually increasing the duty factor of each pulse of each pulse signal, thereby restraining the motor noise caused when the rotor is angularly displaced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit diagram, showing an embodiment of the invention;

FIG. 2 is a timing chart of pulses supplied to nodes of the circuit shown in FIG. 1;

FIG. 5 is an enlarged view, showing another example of a portion of FIG. 2 in which the waveform of a pulse is changed;

FIGS. 6A and 6B are graphs, each showing variations in the current of a pulse (shown in FIG. 5) caused by its duty factor control with the lapse of time;

FIG. 7 is a diagram, showing the rotation of a rotor employed in a stepping motor:

FIG. 8 is a circuit diagram, showing an example of a component shown in FIG. 1;

DETAILED DESCRIPTION OF THE PREFERRED EMBODIMENTS

The invention will now be explained with reference to the accompanying drawings showing embodiments thereof.

FIG. 1 shows a circuit according to an embodiment of the invention. The phases of coils 12 and 13 arranged in a stepping motor 11 vary in accordance with the directions (indicated by arrows EC and FC) of currents flowing between nodes 10a–10c and between nodes 10b–10d, respectively. The magnetic field generated by the coils 12 and 13 rotates the rotor (not shown) of the stepping motor. In a case where the stepping motor is used as the odometer of a vehicle, speed pulses SP are input to a PWM (Pulse Width Modulation)-controlled stepping relay pulse generator 14, which in turn creates stepping relay pulse signals, each pulse of which has a waveform having a duty factor which varies gradually at the time of switching.

The stepping relay pulse signals appear at nodes 10a–10d at time points as shown in FIG. 2, respectively.

Figure 3:
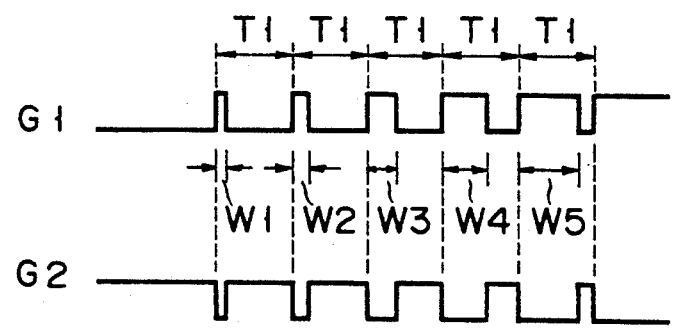
FIG. 3 is an enlarged view, showing a portion of FIG. 2, in which the waveform of a pulse is changed.
Figure 4A:
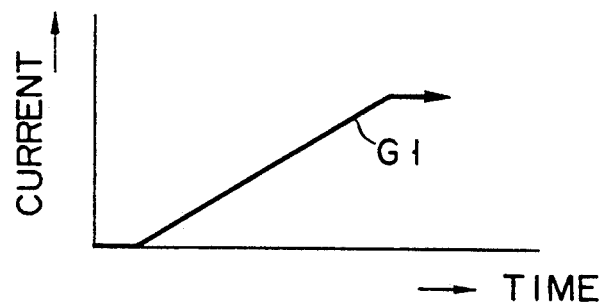
FIGS. 4A and 4B are graphs, each showing variations in the current of a pulse (shown in FIG. 3) caused by its duty factor control with the lapse of time.
Figure 4B:
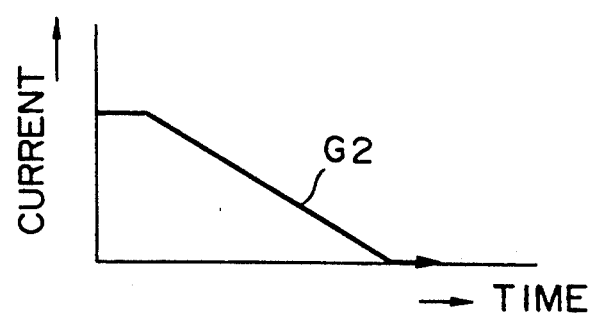

A waveform G1 of each stepping relay pulse appearing when it is shifted from low level "L" to high level "H", and a waveform G2 appearing when it is shifted from "H" to "L" are shown in an enlarged view of FIG. 3. As is evident from FIG. 3, the duty factor of the waveform G1 with respect to a predetermined time period T1 is gradually increased as indicated by W1–W5, while that of the waveform G2 is gradually reduced. Thus, as is shown in FIGS. 4A and 4B, the currents which flow through the coils 12 and 13 are varied gently by the stepping relay pulse having the waveforms G1 and G2. Accordingly, the currents do not adversely affect the rotor at the time of changing the direction thereof. Further, the pulse duty factor may be controlled as shown by waveforms G1' and G2' in FIG. 5 such that it changes greatly in the initial stage, while it changes slightly in the final stage. In this case, the currents flowing through the coils 12 and 13 varies as shown in FIGS. 6A and 6B. Thus, the direction of the current flowing through each coil can be varied more quickly than in the case of FIG. 3.

FIG. 7 shows the rotation of the rotor of the stepping motor caused by the currents flowing through the nodes 10a–10d. The rotation thereof will be explained in more detail with reference to FIGS. 2 and 7.

In a time period A in FIG. 2, currents flow from the node 10c to the node 10a, and from the node 10d to the node 10b, respectively. In this state, the rotor is positioned at a start point P1. Then, in a time period B where a speed pulse SP is being input, the rotor is rotated through 90° C., and shifted to a point P2. While the rotor is being shifted, the duty factor of the pulse SP is controlled by the PWM-controlled stepping relay pulse generator 14 such that it is gradually varied as shown in FIGS. 3 and 5. Thus, the rotor rotates gently between the points P1 and P2 in accordance with the gradually varied duty factor. Similarly, the rotor rotates at a substantially constant speed between points P3 and P4.

As described above, the rotational speed of the stepping motor can be controlled by controlling the pulse duty factor by means of PWM, resulting in a reduction in the motor noise during the rotation of the rotor. An inaudible frequency (of e.g. 20 kHz or more) may be used as a frequency for PWM.

FIG. 8 shows an example of the PWM-controlled stepping relay pulse generator 14 shown in FIG. 1. The circuit of FIG. 8 generates stepping relay pulse signals so that the stepping motor will step forward eight times, and totally rotate through 360°.

The speed pulses SP are input to the input terminal D of a D flip-flop 32 via a buffer 31. The D flip-flop 32 and a flip-flop 33 sample the pulses SP in accordance with a clock signal CP of e.g. 2 kHz. The D flip-flop 33 receives the clock signal via an inverter 34. The outputs Q of the flip-flops 32 and 33 are respectively supplied to the terminals of a NAND gate 35, whose output is in turn supplied to a D flip-flop 37 via an inverter 36, where a signal is sampled in accordance with a clock signal CP' of e.g. 500 kHz.

Further, the output Q of the flip-flop 32 is supplied to a flip-flop 39 via a flip-flop 38, and also to a flip-flop 41 via the flip-flop 38 and an inverter 40. The output Q of the flip-flop 39 is processed through a flip-flop 42 and an inverter 43, to be a selecting signal $\phi$1SEL. The output Q of the flip-flop 39 is processed through an inverter 44 and a flip-flop 45, to be a selecting signal $\phi$2SEL. The output Q of the flip-flop 41 is supplied to a terminal of a NAND gate 47 via an inverter 46, and the output Q of the flip-flop 3 is supplied to the other terminal of the NAND gate 47. The NAND gate 47 outputs an up-down signal $\phi$1U/D. The output Q of the flip-flop 41 is also supplied to a terminal of a NAND gate 49, and the output Q of the flip-flop 39 is supplied further to the other terminal of the NAND gate 47 via an inverter 48. The NAND gate 49 outputs an up-down signal $\phi$2U/D.

Further, the outputs Q of the flip-flops 37 and 41 are respectively supplied to the terminals of a NAND gate 50, which in turn outputs a reset signal $\phi$2$\overline{R}$, while the output Q of the flip-flop 37 is supplied to a terminal of a NAND gate 52 directly, and also supplied to the other terminal of the same via an inverter 51. The gate 52 outputs a reset signal $\phi$1$\overline{R}$.

The above-described signals are input to PWM control circuits 53 and 54, thus controlling the duty factor of each pulse of the stepping relay pulse signals. Only the control circuit 53 is shown in detail, since the circuits 53 and 54 are similar to each other.

A clock signal CP of 2 kHz is supplied to a terminal of a NOR gate 55 via an inverter 56, and the output of an AND gate 60, which are supplied with the outputs of flip-flops 57–59, is input to the other terminal of the NOR gate 55. The output of the NOR gate 55 is input to a flip-flop 57, the output of the flip-flop 57 is input to a flip-flop 58, and the output of the flip-flop 58 is input to a flip flop 59. The flip-flops 57–59 are also supplied with the reset signal $\phi$1$\overline{R}$. Each of the outputs of the flip-flops 57–59 and AND gate 60 is supplied to a terminal of a corresponding one of XOR gates 61–64. The other terminal of each of the XOR gates 61–64 is supplied with the signal $\phi$1U/D having passed through an inverter 65. The outputs of the XOR gates 61–64 are supplied to a pulse width modulator 66, where the pulse duty factor is controlled by means of 3-bit PWM of e.g. 128 kHz, 64 kHz, and 32 kHz. Each of 3-bit signals (OH–7H) representing the duty factor is supplied with one bit by the output of the XOR gate 64. Thus, the duty factor is divided into 8/8, and is 100% utilized.

The PWM duty controlled signal output from the pulse width modulator 66 is input to a terminal of each of AND gates 67 and 68. The selecting signal $\phi$1SEL is input to the other terminal the AND gate 67 directly, and also to the other terminal of the AND gate 68 via an inverter 69. The outputs of the AND gates 67 and 68 are input to terminals D of D flip-flops 70 and 71, respectively. The outputs Q of the D flip-flops 70 and 71 appear at the nodes 10a and 10c (in FIG. 1) in accordance with the clock signal CP of 2 kHz having passed through an inverter 72.

The signals $\phi$2SEL, $\phi$2U/D, and $\phi$2$\overline{R}$ are also supplied to the PWM control circuit 54 having the same structure as the circuit 53, thereby obtaining outputs which appear at the nodes 10b and 10d.

Figure 9:
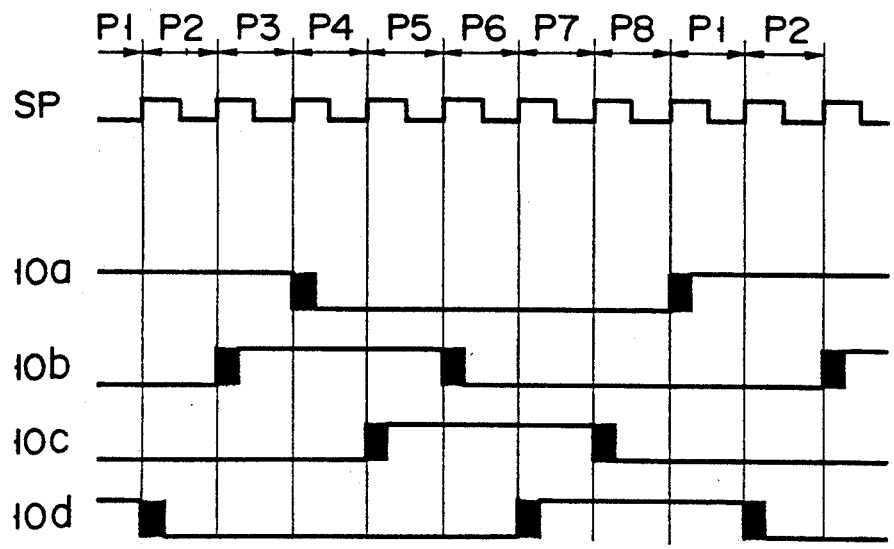
FIG. 9 is a timing chart of those pulses supplied to the nodes shown in FIG. 1 which are controlled by the circuit of FIG. 8.
Figure 10:
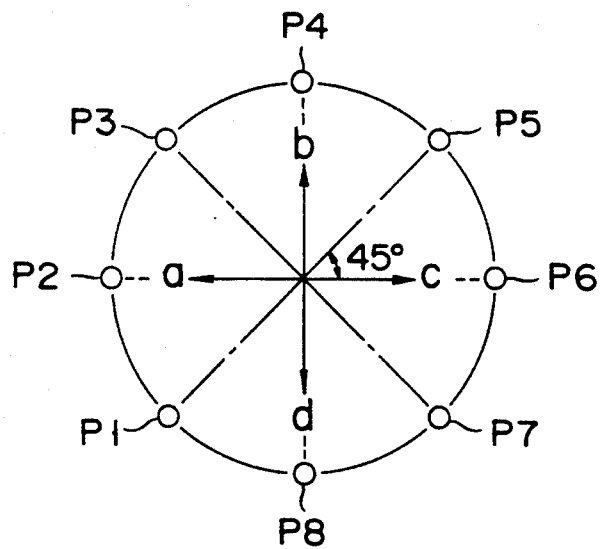
FIG. 10 is a diagram, showing the rotation of a rotor employed in a stepping motor in a case where the stepping motor is controlled by the circuit of FIG. 8.

If the above-described circuit is employed as the PWM-controlled stepping relay pulse generator 14, stepping relay pulse signals as shown in FIG. 9 are obtained at the nodes 10a–10d. The duty factor of each pulse of the stepping relay pulse signals is controlled when it is shifted between low and high levels. Thus, the rotation of the rotor of the stepping motor is controlled as shown in FIG. 10. In this case, the rotor steps forward eight times from a starting point P1 over points 2–8 to the point P1 again, i.e. rotates through 360° C. Hence, it rotates through 45°, at a time, which reduces motor noise.

By virtue of the above structure, the noise of the stepping motor can be restrained without capacitors, and with only two coils as shown in FIG. 1. Thus, each coil can have so many windings, which enables it to be produced at a low cost. Further, the direction of each coil can be changed, thereby saving power. The power consumed by the stepping motor can be restrained by reducing the duty factor of each pulse of the stepping relay pulse signals in a state where the rotor of the stepping motor is no moved.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A driving apparatus for a stepping motor having a rotor, comprising:
    a plurality of coils for rotating the rotor of the stepping motor; and
    control pulse generating means, connected to the plurality of coils and responsive to a input signal, for generating stepping relay pulse signals for imparting exciting current to the plurality of coils, each pulse of the stepping relay pulse signals having a rising edge and a falling edge and having a phase different from that of the input signal;
    wherein the control pulse generating means includes means for controlling a duty factor for each pulse of the stepping relay pulse signals at the rising and falling edges.

2. The driving apparatus according to claim 1, wherein the plurality of coils comprise first and second coils, and the stepping relay pulse signals switch direction of the exciting current flowing through each one of the first and second coils.

3. The driving apparatus according to claim 1, wherein the means for controlling a duty factor includes a pulse-width modulator, and wherein the duty factor gradually increases at the rising edge, and gradually decreases at the falling edge.

4. The driving apparatus according to claim 3, wherein the duty factor varies greatly in an initial stage of transition at the rising edge and at the falling edge, and varies slightly in a final stage of transition at the rising edge and at the falling edge.

5. The driving apparatus according to claim 1, wherein the stepping relay pulse signals include four exciting current signals, each one of the four exciting current signals having a different phase shifted sequentially by a cycle determined in accordance with a cycle of the input signal; and wherein a cycle of the four exciting current signals are related in time to every other cycle of the input signal.

6. The driving apparatus according to claim 1, wherein each pulse of the stepping relay pulse signals rises in synchronism with rising of every fifth pulse of the input signal, and falls in synchronism with rising of every third pulse of the input signal, each pule of the stepping relay pulse signals has a cycle corresponding to 8 cycles of the input signal, and the stepping relay pulse signals include four exciting current signals, each having a different phase shifted sequentially by two cycles of the input signal.

7. The driving apparatus according to claim 1, wherein the control pulse generating means includes means for reducing the duty factor of each pulse of the stepping relay pulse signals when the stepping motor is in a state where the rotor of the stepping motor does not move.

8. A driving apparatus for a stepping motor having a rotor, comprising:
    first and second coils for rotating the rotor; and
    control pulse generating means, connected to the plurality of coils and responsive to a input signal, for generating stepping replay pulses having different phases for imparting exciting current to the first and second coils, each of the stepping relay pulses having a rising edge and a falling edge;
    wherein the control pulse generating means includes means for controlling a duty factor of the stepping relay pulse signals at the rising and falling edges.

9. The driving apparatus according to claim 8, wherein the exciting current flowing through the first and second coils changes direction in response to the stepping relay pulses.

10. The driving apparatus according to claim 8, wherein the means for controlling a duty factor includes a pulse-width modulator, and wherein the duty factor gradually increases at the rising edge thereof, and gradually decreases at the falling edge thereof.

11. The driving apparatus according to claim 10, wherein the duty factor varies greatly in an initial stage of transition at the rising edge and at the falling edge and varies slightly in a final stage of transition at the rising edge and at the falling edge.

12. The driving apparatus according to claim 8, wherein the stepping relay pulses include four pulses having different phases shifted in synchronism with a rising level of the input signal, each one of the stepping relay pulses varying in level in synchronism with every other rise in level of the input signal.

13. The driving apparatus according to claim 8, wherein each pulse of the stepping relay pulse signals rises in synchronism with every fifth rise in the input signal, and falls in synchronism with every third rise in the input signal, each pulse of the stepping relay pule signals having a cycle corresponding to 8 cycles of the input signal, wherein the stepping relay pulse signals include four signals having different phases shifted sequentially by two cycles of the input signal.

14. The driving apparatus according to claim 8, wherein the control pulse generating means includes means for reducing the duty factor of the stepping relay pulse when the stepping motor is in a state where the rotor of the stepping motor does not move.

15. A driving apparatus for a stepping motor having a rotor, comprising;
    a plurality of coils for rotating the rotor of the stepping motor; and
    control pulse generating means, connected to the plurality of coils and responsive to a input signal, for generating stepping relay pulse signals for imparting exciting current to the plurality of coils, each pulse of the stepping relay pulse signals having a rising edge and a falling edge and having a phase different from that of the input signal;
    wherein the control pulse generating means includes means for controlling a duty factor for each pulse of the stepping relay pulse signals at the rising and falling edges at rotational positions of the rotor in the stepping motor where the rotor is driven by the plurality of coils at a minimum angle between respective ones of the plurality of coils and the rotor.

* * * * *

UNITED STATES PATENT AND TRADEMARK OFFICE
CERTIFICATE OF CORRECTION

PATENT NO. : 5,231,343
DATED : July 27, 1993
INVENTOR(S) : Yoshihito Nakamura

It is certified that error appears in the above-indentified patent and that said Letters Patent is hereby corrected as shown below:

Claim 1, column 5, line 13, before "input" change "a" to --an--.

Claim 6, column 5, line 50, change "pule" to --pulse--.

Claim 8, column 6, line 3, before "input" change "a" to --an--.

Claim 8, column 6, line 4, change "replay" to --relay--.

Claim 13, column 6, line 35, change "pule" to --pulse--.

Claim 15, column 6, line 50, before "input" change "a" to --an--.

Signed and Sealed this

Fifth Day of July, 1994

*Attest:*

BRUCE LEHMAN

*Attesting Officer*  Commissioner of Patents and Trademarks